US011897738B2

(12) United States Patent
Gullaksen et al.

(10) Patent No.: US 11,897,738 B2
(45) Date of Patent: Feb. 13, 2024

(54) HOISTING SYSTEM AND METHOD

(71) Applicant: Cameron International Corporation, Houston, TX (US)

(72) Inventors: Rolf Gullaksen, Richmond, TX (US); Erling Tambs, Kristiansand (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 239 days.

(21) Appl. No.: 16/500,609

(22) PCT Filed: Apr. 3, 2018

(86) PCT No.: PCT/US2018/025780
§ 371 (c)(1),
(2) Date: Oct. 3, 2019

(87) PCT Pub. No.: WO2018/187253
PCT Pub. Date: Oct. 11, 2018

(65) Prior Publication Data

US 2021/0179400 A1 Jun. 17, 2021

Related U.S. Application Data

(60) Provisional application No. 62/481,841, filed on Apr. 5, 2017.

(51) Int. Cl.
*B66D 3/04* (2006.01)
*B66D 3/06* (2006.01)
*E21B 19/02* (2006.01)

(52) U.S. Cl.
CPC ............... *B66D 3/043* (2013.01); *B66D 3/06* (2013.01); *E21B 19/02* (2013.01)

(58) Field of Classification Search
CPC . B66D 3/04; B66D 3/043; B66D 3/06; B66D 3/08; E21B 19/02
See application file for complete search history.

(56) References Cited

U.S. PATENT DOCUMENTS 1,436,608 A * 11/1922 Rodier .................. B66D 3/043 254/399
2,973,942 A 3/1961 Schaper
(Continued)

FOREIGN PATENT DOCUMENTS

CN 109969943 A * 7/2019
FR 1520612 A 4/1968
(Continued)

OTHER PUBLICATIONS

International Search Report and Written Opinion issued in International Patent application PCT/US2018/025780 dated Jul. 12, 2018, 16 pages.

*Primary Examiner* — Sang K Kim
*Assistant Examiner* — Nathaniel L Adams
(74) *Attorney, Agent, or Firm* — Jeffrey D. Frantz

(57) ABSTRACT

A hoisting system of this disclosure includes a drawworks, a crown block or a compensator, a traveling block and at least one sheave assembly connected to the crown block or compensator in “Low Load/High Speed” mode and connected to the traveling block in “High Load/Low Speed” mode. A method to lift a load using a hoisting system of this disclosure uses a drawworks, a crown block or a compensator, a traveling block and at least one sheave assembly connected to the crown block or compensator in “Low Load/High Speed” mode and connected to the traveling block in “High Load/Low Speed” mode.

20 Claims, 6 Drawing Sheets

(56) References Cited

U.S. PATENT DOCUMENTS

| | | | | | |
|---|---|---|---|---|---|
| 3,306,469 | A | | 2/1967 | Durand | |
| 3,993,287 | A | * | 11/1976 | Andersson | B66D 3/043 254/399 |
| 4,084,794 | A | * | 4/1978 | Wallace | B66D 3/043 254/399 |
| 6,595,494 | B1 | | 7/2003 | Roodenburg et al. | |
| 6,926,103 | B1 | | 8/2005 | Roodenburg et al. | |
| 7,178,788 | B1 | | 2/2007 | Flud et al. | |
| 11,339,615 | B2 | * | 5/2022 | Holck | E21B 19/006 |
| 2010/0237641 | A1 | * | 9/2010 | Drent | B66C 1/34 294/82.11 |
| 2012/0025156 | A1 | | 2/2012 | Roodenburg et al. | |
| 2015/0361735 | A1 | | 12/2015 | Tambs et al. | |

FOREIGN PATENT DOCUMENTS

| | | | | | |
|---|---|---|---|---|---|
| FR | 2413315 | A1 | | 7/1979 | |
| WO | 9214028 | A2 | | 8/1992 | |
| WO | WO-9214028 | A2 | * | 8/1992 | B66D 3/043 |
| WO | 0129366 | A1 | | 4/2001 | |

* cited by examiner

HOISTING SYSTEM AND METHOD

CROSS-REFERENCE TO CO-PENDING APPLICATIONS

This application is a National Stage Entry of International Application No. PCT/US2018/025780, filed on Apr. 3, 2018, which claims priority to U.S. Provisional Application No. 62/481,841 filed on Apr. 5, 2017.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling and production systems are often employed to access and extract the resource. These systems may be located onshore or offshore depending on the location of the desired resource. Further, such systems may include a wide variety of components, such as various casings, fluid conduits, tools, and the like, that facilitate extraction of the resource from a well during drilling or extraction operations.

Whether onshore or offshore, a drilling rig can be provided to drill a well to access the desired resource. A drill string can be suspended from the drilling rig and rotated to drill the well. While the drill string can be suspended from a kelly and driven by a rotary table on the drill floor of the drilling rig, in some instances the drill string is instead suspended from and driven by a top drive of the drilling rig. Such a top drive generally includes a drive stem (also referred to as a main shaft) that can be connected to the drill string. A motor in the top drive is connected to the drive stem to drive rotation of the drill string via the drive stem. The top drive can be raised and lowered via a mast and a hoisting system to raise and lower the drill string within the well.

The drilling rig also includes a hoisting system configured to raise and to lower drilling equipment relative to the drill floor. The hoisting system typically includes a crown block, a traveling block, a drawworks system, and a cable assembly (e.g., wire) that extends from the drawworks system and couples the crown block to the traveling block. As the number of reeves or lines of the hoisting system increase, the speed of the system decreases, and can decrease to a point where the speed is too low. Therefore, the cable assembly of hoisting system must be re-reeved so that it has fewer lines (e.g. 18 lines to 12 lines). The opposite is also true when a higher load capacity is needed.

SUMMARY

Various features, aspects, and advantages of the present disclosure will become better understood when the following detailed description is read with reference to the accompanying figures in which like characters represent like parts throughout the figures, wherein:

Embodiments of this disclosure include a hoisting system comprising: a crown block; a traveling block; and at least one sheave assembly moveable between and alternatively connectable to the crown and traveling blocks. In some embodiments, the crown block may be in communication with a compensator such as a top mounted compensator. The traveling block may include a sheave cluster containing a gap sized to accommodate one or more sheaves of the sheave assembly. When the sheave assembly is connected to the crown block, the hoisting system has a first load capacity and a first travel speed (e.g., Low Load/High Speed" mode). When the sheave assembly is connected to the traveling block, the hoisting system has a second higher load capacity and a second lower travel speed (e.g., "High Load/Low Speed" mode).

Failsafe locking means in communication with a control module are provided for releasably connecting the sheave assembly to the crown and traveling blocks. By way of example, for connection to the traveling block a lower end of the sheave assembly may include a pin for insertion into a pin receiver of the traveling block. For connection to the crown block, an upper end of the sheave assembly may include a pair of arms that are received by an arm receiver of the crown block.

Embodiments of a method to lift a load using a hoisting system of this disclosure includes providing a first load capacity and first travel speed by connecting the at least one sheave assembly to the crown block; and providing a second higher load capacity and second lower travel speed by connecting the at least one sheave assembly to the traveling block.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to drilling and production system comprising a hoisting system that may be utilized to support and lift a load (e.g., pipe section, drill pipe collar, casing section, or the like) within a drilling and production system.

To facilitate discussion, certain embodiments disclosed herein refer to pipe sections and drill strings; however, it should be understood that the disclosed embodiments may be adapted for use with any of a variety of tubular structures, including drill pipe collars, casing sections, or the like. Additionally, certain embodiments relate to a subsea (e.g., offshore) drilling and production system; however, it should be understood that the disclosed embodiments may be adapted for use within an onshore (e.g., land-based) drilling and production system.

Figure 1:
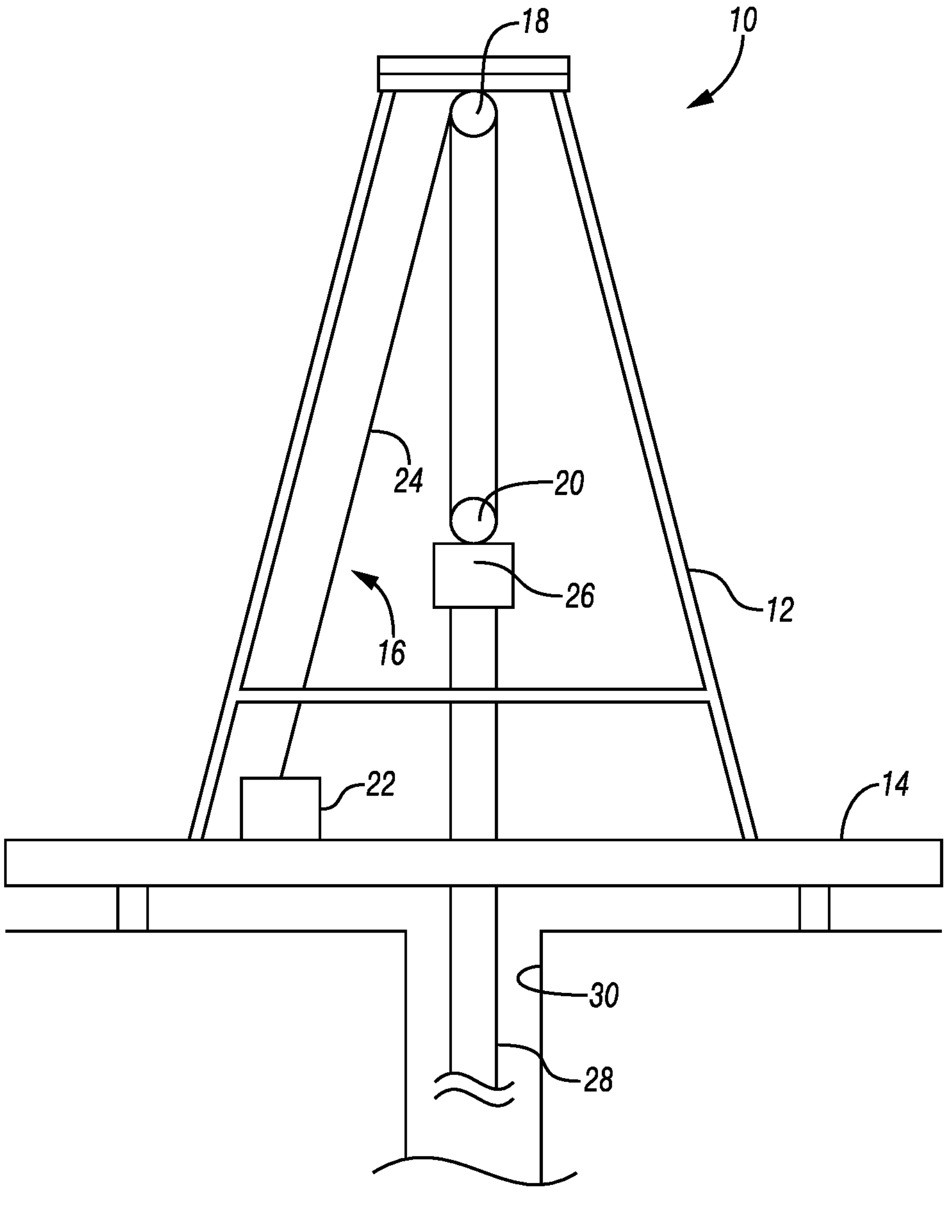
FIG. 1 is a schematic diagram of a portion of a drilling and production system having a known hoisting system.

With the foregoing in mind, FIG. 1 is a schematic diagram of a portion of a drilling and production system 10, in accordance with an embodiment of the present disclosure. As shown, the system 10 includes a derrick 12 supported by a platform 14 (e.g., floating platform or vessel). The system 10 includes a hoisting system 16 configured to raise and to lower drilling equipment relative to the drill floor 14. In the illustrated embodiment, the hoisting system 16 includes a crown block 18, a traveling block 20, a drawworks system 22, and a cable assembly 24 (e.g., wire) that extends from the drawworks system 22 and couples the crown block 18 to the traveling block 20. In the illustrated embodiment, a top drive 26 is coupled to the traveling block 20, and a drill string 28 supporting a drill bit (not shown) is suspended from the top drive 26 and extends through the platform 14 into a wellbore 30. The top drive 26 may be configured to rotate the drill string 28, and the hoisting system 16 may be configured to raise and to lower the top drive 26 and the drill string 28 relative to the platform 14 to facilitate drilling of the wellbore 30.

Schematically represented on FIGS. 2-8 is an example of a hoisting system 16 of the disclosure, enabling to increase load capacity. In embodiments, the hoisting system 16 comprises a drawworks system 22 including a cable assembly 24, a crown block 18, a traveling block 20 and a deadline anchor 25. In some embodiments, the hoisting system 16 may include a compensator such as a top mounted compensator 19 of a kind known in the art to allow hook load variations to be addressed directly to the crown block 18.

Figure 2:
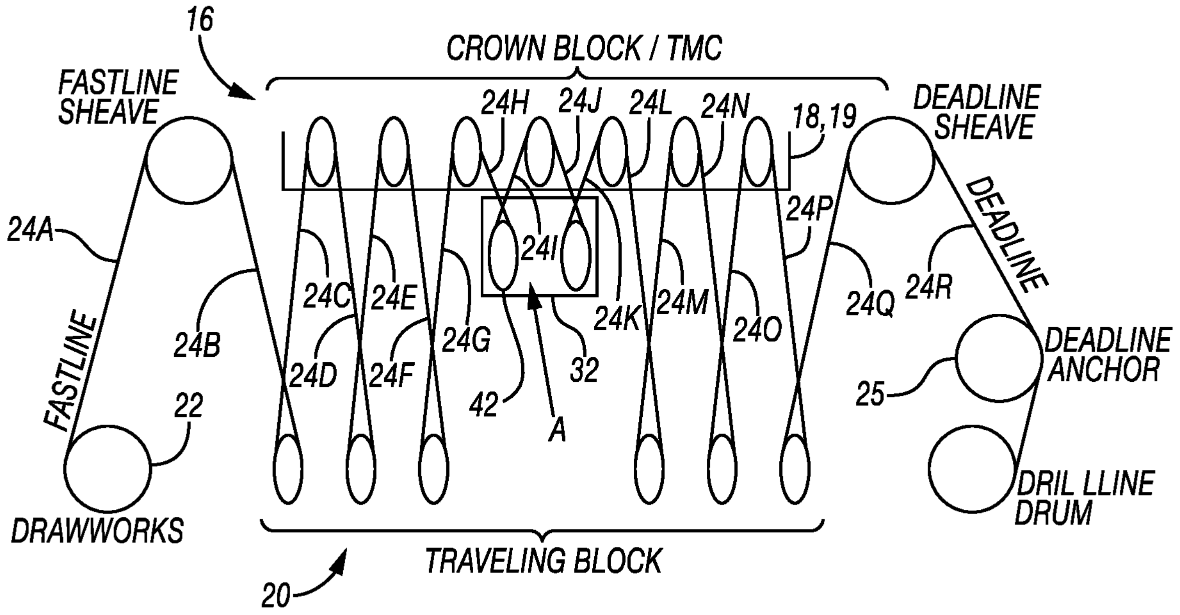
FIG. 2 is a schematic representation of a hoisting system according to the present disclosure when in a low load/high speed mode.
Figure 3:
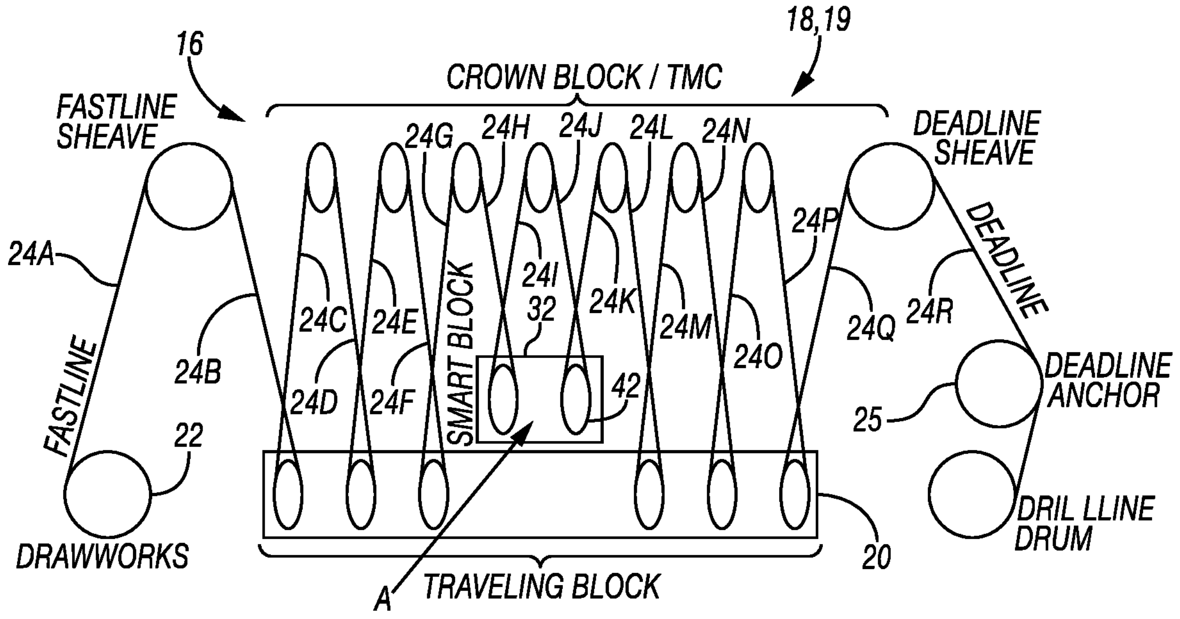
FIG. 3 is a schematic representation of a hoisting system according to the present disclosure when in a high load/low speed mode.
Figure 4:
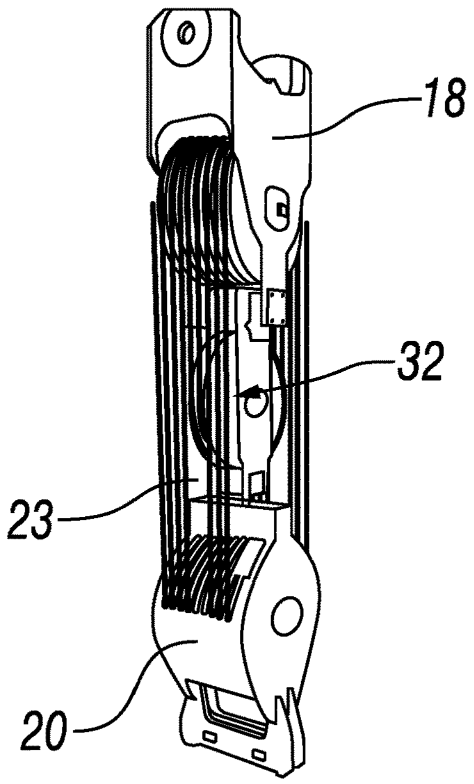
FIG. 4 is an isometric view of a hoisting system according to the present disclosure. A gap that accommodates sheaves of the sheave assembly may be provided in the traveling block's sheave cluster.
Figure 5:
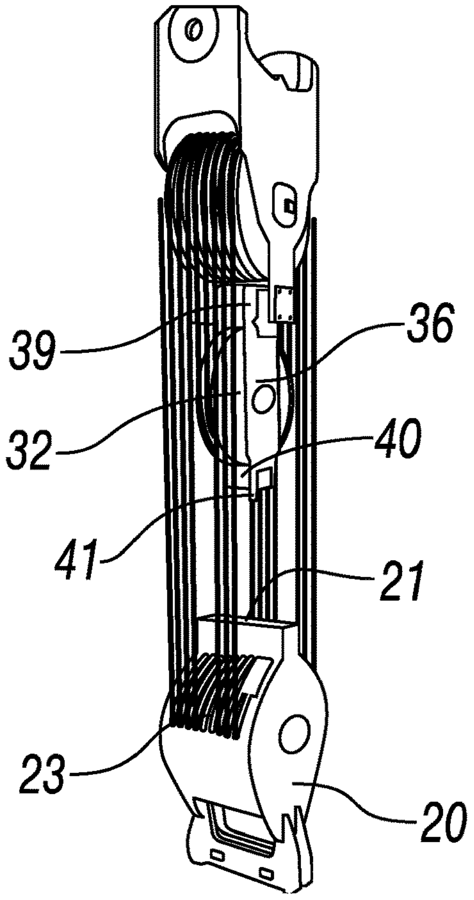
FIG. 5 is an isometric view of a hoisting system according to the present disclosure when in a high load/low speed mode. The sheave assembly is connected to the crown block.
Figure 6:
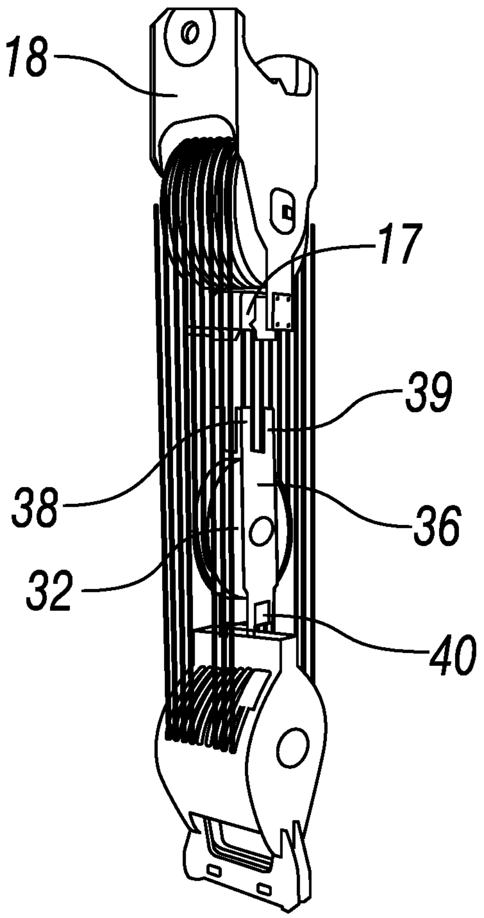
FIG. 6 is an isometric view of a hoisting system according to the present disclosure when in a high load/low speed mode. The sheave assembly is connected to the traveling block.
Figure 7:
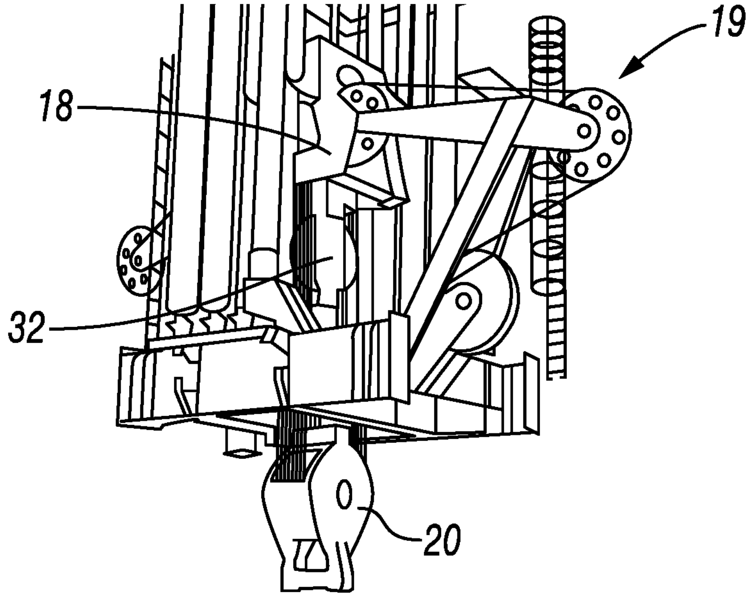
FIG. 7 is an isometric view of a hoisting system according to the present disclosure when in a low load/high speed mode.
Figure 8:
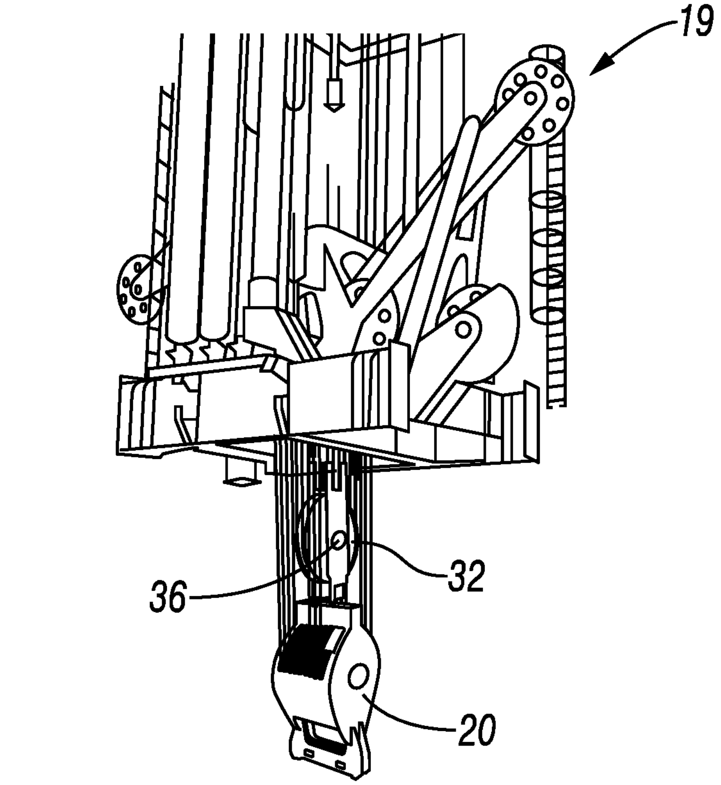
FIG. 8 is an isometric view of a hoisting system according to the present disclosure when in a high load/low speed mode.
Figure 9:
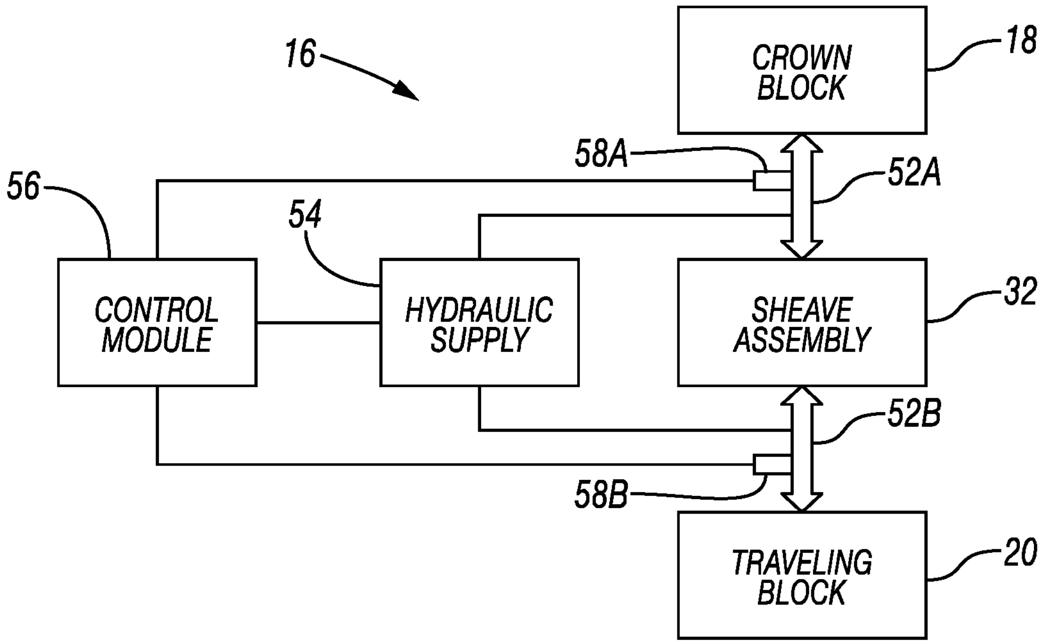
FIG. 9 is a schematic of a control system according to the present disclosure.

In embodiments, the hoisting system 16 comprises a sheave assembly 32 that is attached to the crown block 18 or top mounted compensator 19 in "Low Load/High Speed" mode, as schematically illustrated in FIG. 2, and attached to the traveling block 20 in "High Load/Low Speed" mode, as schematically illustrated in FIG. 3. FIGS. 2 & 3 show a hoisting system 16 for 12 lines 24B-H, 24L-Q in Low Load/High Speed mode and 16 lines 24B-Q in High Load/Low Speed mode. (Fast line 24A and deadline 24R are not included in the line count when calculating load and speed for the hoisting system 16.) By alternately connecting the sheave assembly 32 to the crown or traveling blocks 18, 20, the hoisting system 16 is provided a different load and speed capability without the need to re-reeve the cable assembly 24.

In the embodiment presented on FIGS. 4-8, the hoisting system 16 of the disclosure comprises a sheave assembly 32 and, in the presented example, enables to increase the load capacity from a 14-lines hoisting system 16 in Low Load/High Speed mode to an 18-lines hoisting system 16 in High Load/Low Speed mode. As previously stated, fast line 24A and deadline 24R do not count when calculating the load and speed.

In embodiments, connection of the sheave assembly 32 to either the top mounted compensator 19 or crown block 18, or to the traveling block 20, is done remotely from a drilling control room, for example. A control module 56 may be in electronic or network communication with failsafe locking means 52 for locking and unlocking the sheave assembly 32 to the crown and traveling blocks 18, 20. The control module 56 may include one or more PLCs or microprocessors with associated software for providing the desired control. Appropriate control logic may be employed to ensure the sheave assembly 32 is connected to one but not both of the blocks 18, 20. Sensors 58A, 58B may be used to provide positive verification that the locking means 52A, 52B is in a locked (connected) or unlocked (disconnected) state. In some embodiments, the failsafe locking means 52 may include a hydraulic driver or supply 54 or its equivalent. The supply 54 may be located in a top drive loop, with the lock/unlock signal and control coming from the derrick side of the hoisting system 16.

Sheave assembly 32 may include a yoke 36 having an upper end 38 releasably connectable to the crown block 18 or top mounted compensator 19 and a lower end 40 releasably connectable to the traveling block 20. Failsafe locking means, which can be hydraulically actuatable and controlled from the drilling control room, are provided for releasably connecting the sheave assembly to the crown and traveling blocks. For example, the upper end 38 may include arms 39 received by an arm receiver 17 of the crown block 18. In some embodiments the arm receiver 17 is a cross bar. The drawworks system 22 applies the necessary force to engage the arms 39 with the cross bar 17.

By way of another example, the lower end 40 may include a pin 41 received by a pin receiver 21 of the traveling block 20. Moving the traveling block 20 toward the crown block 18 permits the pin 41 to be received by the receiver 21. As the traveling block 20 then moves away from the crown block 18, the pin 41 remains engaged and sheave assembly 32 remains connected to the traveling block 20 and disengages from the crown block 18. The receiver 41 may be hydraulically actuatable and controlled from the drilling control room.

When connected to the top mounted compensator 19, the sheave assembly 32 might be parallel to the sheaves in the traveling block 20. When connected to the traveling block 20, the sheave assembly 32 might be parallel to the sheaves in the traveling block and, therefore, to compensate for the angle between the top mounted compensator 19 (or crown block 18) and the traveling block 20.

The sheave assembly 32 of the disclosure may comprise any number of sheaves 42, from 1 sheave and upwards. In examples, the number of lines (wire or cable parts) in a hoisting system 16 of the disclosure might be increased from 12 lines to 16 lines as shown in FIGS. 2 & 3, with 2 sheaves 42 in the sheave assembly 32). In other examples, the lines might be increased from 10 and up, for example increasing from 10 lines to 18 lines (with 4 sheaves 42 in the sheave assembly 32).

In examples of the hoisting system 16 of the disclosure, the top mounted compensator 19, crown block 18, or traveling block 20 (or some combination thereof) might be designed to accommodate the sheave assembly 32. Therefore, the travelling block's sheave cluster might include a gap 23. To each side of the gap 23, the cable assembly 24 runs from the crown block 18 to the travelling block 20. Within the gap 23, the cable assembly 24 runs from the crown block 18 to the sheave assembly 32. The gap 23 can be the distance represented by the sheaves 42 of the sheave assembly 32. In other words, the sheaves 42, rather than being located on the traveling block 20, are moved to the sheave assembly 32, thereby leaving gap 23 in the traveling block's sheave cluster.

In embodiments, the sheave assembly 32 might be connected to the top mounted compensator 19 or crown block 18 as well as to the traveling block 20 in a way that enables the assembly 32 to accommodate the difference in angle between the compensator 19 and traveling block 20 or between the crown and traveling blocks 18, 20.

The disclosed hoisting system 16 thus enables to increase the system load capacity compared to known hoisting systems without the need for increasing any horsepower on the drawworks system 22, for example, or increasing the cable size. Further, the cable might not have to be re-reeved.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hoisting system comprising:

a crown block;

a traveling block;

a rotatable drive coupled to the traveling block;

a cable assembly that couples the crown block to the traveling block; and at least one sheave assembly comprising a plurality of sheaves mounted on a common yoke, the at least one sheave assembly being separate from the crown block and the traveling block, and the at least one sheave assembly being moveable between and alternately connectable to the crown and traveling blocks, wherein connection of the at least one sheave assembly to the crown block or to the traveling block is accomplished remotely, the traveling block further comprising a sheave cluster including a gap sized to accommodate the plurality of sheaves mounted on the common yoke of the at least one sheave assembly, the gap extending in a direction between sheaves of the sheave cluster of the traveling block, and the direction of the gap being parallel to a rotational axis of the sheaves of the sheave cluster, wherein, within the gap, the cable assembly runs from the crown block to the at least one sheave assembly;

the hoisting system having:

a first load capacity when the at least one sheave assembly is connected to the crown block in a first configuration; and a second higher load capacity when the at least one sheave assembly is connected to the traveling block in a second configuration, wherein the at least one sheave assembly is connected to the crown block and disconnected from the traveling block in the first configuration, and the at least one sheave assembly is disconnected from the crown block and connected to the traveling block in the second configuration, wherein the hoisting system is configured to raise and lower the traveling block, the rotatable drive, and a component coupled to and extending below the rotatable drive, wherein the rotatable drive is configured to rotate the component.

2. A hoisting system according to claim 1, the hoisting system having:

a first travel speed when the at least one sheave assembly is connected to the crown block in the first configuration; and a second lower travel speed when the at least one sheave assembly is connected to the traveling block in the second configuration.

3. A hoisting system according to claim 1, further comprising:

the at least one sheave assembly including a pair of arms at an upper end;

the crown block including an arm receiver configured to engage the pair of arms;

the at least one sheave assembly including a pin at a lower end; and the traveling block including a pin receiver configured to engage the pin.

4. A hoisting system according to claim 1, wherein the sheaves of the sheave cluster of the traveling block, the plurality of sheaves of the at least one sheave assembly, and sheaves of the crown block have parallel rotational axes.

5. A hoisting system according to claim 1, wherein the [[the]] rotatable drive comprises a motor.

6. A hoisting system according to claim 1, wherein the component comprises a pipe section, a drill pipe collar, a casing section, or a drill string of a drilling and production system.

7. A hoisting system according to claim 1, comprising a controller coupled to a first lock and a second lock, wherein the controller is configured to control the first lock to selectively lock and unlock the at least one sheave assembly to the crown block in the respective first and second configurations, wherein the controller is configured to control the second lock to selectively unlock and lock the at least one sheave assembly to the traveling block in the respective first and second configurations.

8. A hoisting system according to claim 1, wherein the cable assembly runs from the crown block to the traveling block on opposite first and second sides of the gap, the cable assembly runs a first plurality of lines from the crown block to the traveling block on the first side of the gap, the cable assembly runs a second plurality of lines from the crown block to the traveling block on the second side of the gap, and the cable assembly runs a third plurality of lines from the crown block to the at least one sheave assembly within the gap.

9. A hoisting system according to claim 8, wherein the first plurality of lines is greater than the third plurality of lines, and the second plurality of lines is greater than the third plurality of lines.

10. A hoisting system according to claim 9, wherein the third plurality of lines comprises at least four lines, and each of the first and second pluralities of lines comprise at least five lines.

11. A hoisting system according to claim 8, wherein the first plurality of lines, the second plurality of lines, and the third plurality of lines are cable portions of a common cable of the cable assembly.

12. A hoisting system comprising:

a crown block;

a traveling block;

a rotatable drive coupled to the traveling block;

a cable assembly that couples the crown block to the traveling block; and at least one sheave assembly comprising a plurality of sheaves mounted on a common yoke, the at least one sheave assembly being separate from the crown block and the traveling block, and the at least one sheave assembly being moveable between and alternately connectable to the crown and traveling blocks, wherein connection of the at least one sheave assembly to the crown block or to the traveling block is accomplished remotely, wherein the at least one sheave assembly is connected to the crown block and disconnected from the traveling block in a first configuration, and the at least one sheave assembly is disconnected from the crown block and connected to the traveling block in a second configuration, the traveling block further comprising a sheave cluster including a gap sized to accommodate the plurality of sheaves mounted on the common yoke of the at least one sheave assembly, the gap extending in a direction between sheaves of the sheave cluster of the traveling block, and the direction of the gap being parallel to a rotational axis of the sheaves of the sheave cluster, wherein, within the gap, the cable assembly runs from the crown block to the at least one sheave assembly, wherein the hoisting system is configured to raise and lower the traveling block, the rotatable drive, and a component coupled to and extending below the rotatable drive, wherein the rotatable drive is configured to rotate the component.

13. A hoisting system according to claim 12, the hoisting system having:

a first load capacity when the at least one sheave assembly is connected to the crown block in the first configuration; and a second higher load capacity when the at least one sheave assembly is connected to the traveling block in the second configuration.

14. A hoisting system according to claim 12, the hoisting system having:

a first travel speed when the at least one sheave assembly is connected to the crown block in the first configuration; and a second lower travel speed when the at least one sheave assembly is connected to the traveling block in the second configuration.

15. A hoisting system according to claim 12, further comprising:

the at least one sheave assembly including a pair of arms at an upper end;

the crown block including an arm receiver configured to engage the pair of arms;

the at least one sheave assembly including a pin at a lower end; and the traveling block including a pin receiver configured to engage the pin.

16. A hoisting system according to claim 12, further comprising a compensator in communication with the crown block.

17. A hoisting system according to claim 12, further comprising a drawworks.

18. A method to lift a load using a hoisting system comprising a crown block, a traveling block, a rotatable drive coupled to traveling block, a cable assembly that couples the crown block to the traveling block, and at least one sheave assembly comprising a plurality of sheaves mounted on a common yoke, the at least one sheave assembly being separate from the crown block and the traveling block, the at least one sheave assembly being moveable between and alternately connectable to the crown and traveling blocks, the traveling block further comprising a sheave cluster including a gap sized to accommodate the plurality of sheaves mounted on the common yoke of the at least one sheave assembly, the gap extending in a direction between sheaves of the sheave cluster of the traveling block, and the direction of the gap being parallel to a rotational axis of the sheaves of the sheave cluster, wherein, within the gap, the cable assembly runs from the crown block to the at least one sheave assembly, the method comprising:

providing a first load capacity by remotely connecting the at least one sheave assembly to the crown block via an upper end of the common yoke in a first configuration; and providing a second higher load capacity by remotely connecting the at least one sheave assembly to the traveling block via a lower end of the common yoke in a second configuration, wherein the at least one sheave assembly is connected to the crown block and disconnected from the traveling block in the first configuration, and the at least one sheave assembly is disconnected from the crown block and connected to the traveling block in the second configuration, wherein the hoisting system is configured to raise and lower the traveling block, the rotatable drive, and a component coupled to and extending below the rotatable drive, wherein the rotatable drive is configured to rotate the component.

19. A method according to claim 18, further comprising:

providing a first travel speed when the at least one sheave assembly is connected to the crown block via the upper end of the common yoke in the first configuration; and providing a second lower travel speed when the at least one sheave assembly is connected to the traveling block via the lower end of the common yoke in the second configuration.

20. A hoisting system according to claim 18, wherein the hoisting system includes a top mounted compensator in communication with the crown block.

* * * * *